United States Patent
Widman et al.

[11] Patent Number: 5,820,895
[45] Date of Patent: Oct. 13, 1998

[54] CONDUCTIVE PROBE FOR HEATING CONTACT LENS MOLD ASSEMBLIES DURING DEMOLDING

[75] Inventors: Michael F. Widman; Henri A. Dagobert, both of Jacksonville, Fla.

[73] Assignee: Johnson & Johnson Vision Products, Inc., Jacksonville, Fla.

[21] Appl. No.: 657,565

[22] Filed: Jun. 4, 1996

[51] Int. Cl.$^6$ ............ B29D 11/00; B29C 33/02; B29C 39/38
[52] U.S. Cl. ............ 425/436 R; 249/78; 264/2.3; 264/2.6; 264/334; 425/440; 425/808; 425/DIG. 110
[58] Field of Search ............ 425/143, 436 R, 425/436 RM, 440, 808, DIG. 110; 264/2.3, 2.6, 334; 249/78; 219/243

[56] References Cited

U.S. PATENT DOCUMENTS

| | | | |
|---|---|---|---|
| 5,015,280 | 5/1991 | Kimoto et al. | 425/808 |
| 5,417,557 | 5/1995 | Ross et al. | 425/436 R |
| 5,435,943 | 7/1995 | Adams et al. | 425/808 |
| 5,540,140 | 7/1996 | Lust et al. | 425/808 |
| 5,542,978 | 8/1996 | Kindt-Larsen et al. | 425/808 |
| 5,569,474 | 10/1996 | Kitaichi et al. | 249/78 |

Primary Examiner—Patrick Ryan
Assistant Examiner—Joseph Leyson

[57] ABSTRACT

Demolding apparatus for reliably and repeatedly mechanically separating contact lens mold assemblies without damaging the contact lens formed therebetween. The mold assembly includes a frontcurve mold having a central mold section with a surrounding flange, and a corresponding backcurve mold also having a central mold section with a surrounding flange, with a contact lens being molded therebetween. The demolding apparatus includes a conductive heating probe which contacts the backcurve mold of the lens mold assembly to conductively heat the backcurve mold. Heat is conducted by the backcurve mold to cause a temperature gradient between the backcurve mold and the lens being demolded. The temperature gradient causes a differential expansion and shifting of the surface of the backcurve mold relative to the surface of the lens to lessen the adhesion therebetween to assist in separation of the molds, while leaving the lens in the frontcurve mold. The conductive heating probe includes a convex heating surface which contacts and is the same general shape as a concave surface on the backcurve mold, and can also include a compliant heat conductor to conform to the concave surface on the backcurve mold. In one embodiment, the apparatus includes a conductive heating probe assembly having an n×m array of conductive heating probes which contact each backcurve mold of an n×m array of molds assemblies positioned in a support pallet.

22 Claims, 8 Drawing Sheets

CONDUCTIVE PROBE FOR HEATING CONTACT LENS MOLD ASSEMBLIES DURING DEMOLDING

BACKGROUND OF THE INVENTION

1. Field of the Invention

The present invention relates generally to a demolding arrangement for demolding cast lens mold assemblies wherein a molded assembly, comprising a frontcurve, a spaced backcurve, and a molded lens formed therebetween, are separated or demolded in a manner which improves the simplicity and efficiency of the demolding operation.

More particularly, the subject invention pertains generally to an arrangement for producing ophthalmic contact lenses in cast contact lens mold assemblies, and providing for the improved removal of molded ophthalmic contact lenses from the molds in which they are cast. The present invention is particularly well suited to molded ophthalmic lenses such as hydrogel contact lenses, although it also has applicability to other small, high-precision ophthalmic lenses such as intraocular lenses.

Prior to the demolding operation in the casting of soft contact lenses, typically one of the lens mold surfaces is heated so as to cause the mold to release easily from the lens. The present invention describes a conductive method of heating the noncritical side of a backcurve mold. The method entails the use of a convex contoured heated probe, either rigid or compliant, which contacts the noncritical side of a backcurve mold having a similarly contoured concave shape. The present invention introduces a well defined heat pattern with a favorable temperature gradient which represents an advantage over other known prior art heated demolding approaches.

2. Discussion of the Prior Art

As the ophthalmic lens industry has grown, and in particular the industry related to supplying contact lenses which are provided for periodic frequent replacement, the number of contact lenses required to be produced has increased dramatically. This has spurred manufacturers to strive for automated methods and apparatus which are adaptable to automated practices and consistent performance.

It is generally known in the prior art to make ophthalmic lenses, such as soft hydrogel contact lenses, by molding a monomer or monomer mixture in a mold such as one made from polystyrene or polypropylene.

Examples of this prior art can be found in U.S. Pat. Nos. 5,039,459, 4,889,664 and 4,565,348. These patents discuss therein the requirement for a polystyrene mold in which the materials, chemistry and processes are controlled such that the mold portions do not require undue force to separate by sticking to the lens or to each other. In contrast to the above polystyrene molds, another example is the use of polypropylene or polyethylene molds as described in U.S. Pat. No. 4,121,896.

The mold assembly to mold an ophthalmic contact lens typically includes a lower concave mold portion referred to as a frontcurve and an upper convex mold portion referred to as a backcurve. The concave surface of the lower frontcurve and the convex surface of the upper backcurve define therebetween a mold cavity for a contact lens. A particular problem in the prior art is that the frontcurve and backcurve molds are usually surrounded by a flange, and the monomer or monomer mixture is supplied in excess to the concave frontcurve mold prior to the assembly of the molds. As the molds are placed together, defining the lens and forming an edge, the excess monomer or monomer mixture is expelled from the mold cavity and rests on or between the flange of one or both mold portions. Upon polymerization, this excess material forms an annular ring around the mold assembly which resists separation of the mold portions during a demolding operation.

In such contact lens manufacturing processes, lens defects such as chips and tears as well as missing lenses are believed to result, in part, from the demolding operation. Much development has been taken place on different mechanical approaches for separating the mold halves. However, the mechanical technique is only part of the process. The method of heating the backcurve mold prior to separation of the mold halves is also very critical. In an ideal case, one wants to have concentrated heat at the backcurve mold/lens interface and reduced heat at the backcurve mold flange/polymer ring interface and reduced heat at the frontcurve mold/lens interface. Because the polymer (lens material) releases easier from the polystyrene mold when heated, an ideal system has the excess polymer ring attached to the removed backcurve mold and the undisturbed lens attached to the frontcurve mold.

One known prior art process for separating the mold portions applies heat to the backcurve mold by a heated air stream. The heated air stream is directed against the exterior of the backcurve mold, from which heat is conducted to the upper surface of the lens. Heat is transferred by thermal conduction through the backcurve mold, the molded lens, and the frontcurve mold. The heating of the backcurve mold can be performed in two sequential steps, a preheat stage and a heat/pry stage. In the heat/pry stage the mold is clamped in place, and pry fingers are inserted under the flange of the backcurve mold. A force is then applied to the backcurve mold by the pry fingers during a heating cycle. When the required temperature has been reached, the backcurve mold breaks free and one end thereof is lifted by the pry fingers. After the backcurve mold portion has been detached from the frontcurve mold portion on at least one side, the mold exits the heater. The backcurve mold and annular flashing are then totally removed. Several notable disadvantages of this approach are a slow heat up time, a poorly defined application zone, and an inconsistent, inaccurate cavity-to-cavity energy transfer rate.

While the aforementioned method has some efficacy in assisting in the removal of a lens from between opposed mold portions, the temperature gradient achieved from the heated backcurve mold across the lens to the frontcurve mold is relatively small. This prior art method has not been entirely satisfactory because the induced thermal gradient is not sufficient to fully and repeatedly separate the mold portions.

Accordingly, a second prior art method has also been developed wherein the backcurve mold portion is irradiated with electromagnetic radiation emanating from a laser, which is absorbed thereby to cause a substantial temperature gradient between the backcurve mold portion and the contact lens being demolded. The temperature gradient causes a differential expansion and shifting of the surface of the heated backcurve mold portion relative to the surface of the lens to lessen the adhesion therebetween to assist in the separation of the mold portions, while leaving the lens in the frontcurve mold portion. The backcurve mold portion is preferably irradiated by a laser producing radiation with a wavelength between 1 $\mu$m and 20 $\mu$m. The separating fingers are joined together to form a U-shaped separator, and the laser beam is directed through the U opening in the U-shaped separator to irradiate the backcurve mold portion. The one notable disadvantage of this approach is the cost of the laser units.

Steam heated demolding was also previously used in a production process. Notable disadvantages of this approach were issues surrounding the handling of condensate on the backcurve mold and in the equipment, a long equipment heat up time, and complexity.

SUMMARY OF THE INVENTION

Accordingly, it is a primary object of the present invention to provide an improved demolding arrangement for cast lens mold assemblies which can easily and repeatedly separate the lens mold portions without damaging the lens formed therebetween.

A further object of the subject invention is the provision of an arrangement for separating a backcurve mold from a frontcurve mold of a contact lens mold assembly which improves the simplicity and efficiency of the demolding operation. In a preferred embodiment, a substantial temperature gradient is created between the backcurve mold and the contact lens formed in the cavity of the contact lens mold assembly.

Another object of the present invention is to provide an automated apparatus and method for demolding contact lens mold assemblies in a consistent and reliable manner, to thereby enhance the production of defect-free contact lenses, and minimize tearing of the lens and breakage of the lens mold parts.

The present invention presents a simple, easy to clean, low-cost, very repeatable, and unique conductive probe heating approach for assisting in separating or demolding cast contact lens mold assemblies. The conductive heating arrangement for contact lens demolding represents a distinctly unique approach relative to other prior art approaches used for similar purposes. Hot air and steam heating represent a convective heat transfer principle. Laser and infrared heating represent a radiation heat transfer principle. Thus, a concept representing a conductive heat transfer principle is unique.

In accordance with the teachings herein, the present invention provides apparatus for demolding a mold assembly, which includes a frontcurve mold having a central mold section with a surrounding flange, and a corresponding backcurve mold also having a central mold section with a surrounding flange, with a contact lens being molded therebetween. The flanges of the frontcurve and backcurve molds are spaced apart and parallel to each other. The demolding apparatus includes a conductive heating probe which contacts the backcurve mold of the lens mold assembly to conductively heat the backcurve mold. Heat is conducted by the backcurve mold to cause a temperature gradient between the backcurve mold and the lens being demolded. The temperature gradient causes a differential expansion and shifting of the surface of the backcurve mold relative to the surface of the lens to lessen the adhesion therebetween to assist in separation of the molds, while leaving the lens in the frontcurve mold.

In greater detail, The conductive heating probe includes a convex heating surface which contacts and is the same general shape as a concave surface on the backcurve mold. The conductive heating probe can also include a compliant heat conductor to conform to the concave surface on the backcurve mold. The compliant heat conductor can comprise a thin element positioned on the end of the conductive heating probe. The conductive heating probe can be spring mounted in a support plate to spring bias the conductive heating probe against the backcurve mold. Moreover, a spring preload adjustor can be provided for adjusting the preload bias on the spring of the conductive heating probe. Alternatively, the free weight of the conductive heating probe can provide the force to bias the conductive heating probe against the backcurve mold. The conductive heating probe can also include a cartridge electrical heating element and a thermocouple for detecting and controlling the temperature of the conductive heating probe.

The demolding apparatus can include a support pallet for supporting the mold assembly and a separating fixture for providing a separation force between the spaced flanges of the frontcurve and backcurve molds of the mold assembly.

The support pallet preferably supports a plurality of mold assemblies arranged in a row and column array of mold assemblies. In those embodiments, the apparatus can include a conductive heating probe assembly having a row and column array of conductive heating probes which contact each backcurve mold of the array of mold assemblies, for conductively contacting and heating the array of mold assemblies. A lift cylinder raises and lowers the conductive heating probe assembly relative to the support pallet. During operation, the weights of the individual conductive heating probes are maintained on the array of mold assemblies during demolding to maintain the array of mold assemblies properly positioned in the support pallet during demolding. A lifting cam is provided to lift the conductive probe assembly from the pallet following demolding as an indexer conveys the pallet past the assembly lifting cam.

BRIEF DESCRIPTION OF THE DRAWINGS

The foregoing objects and advantages of the present invention for a wedge demolding apparatus and method may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE INVENTION

Figure 1:
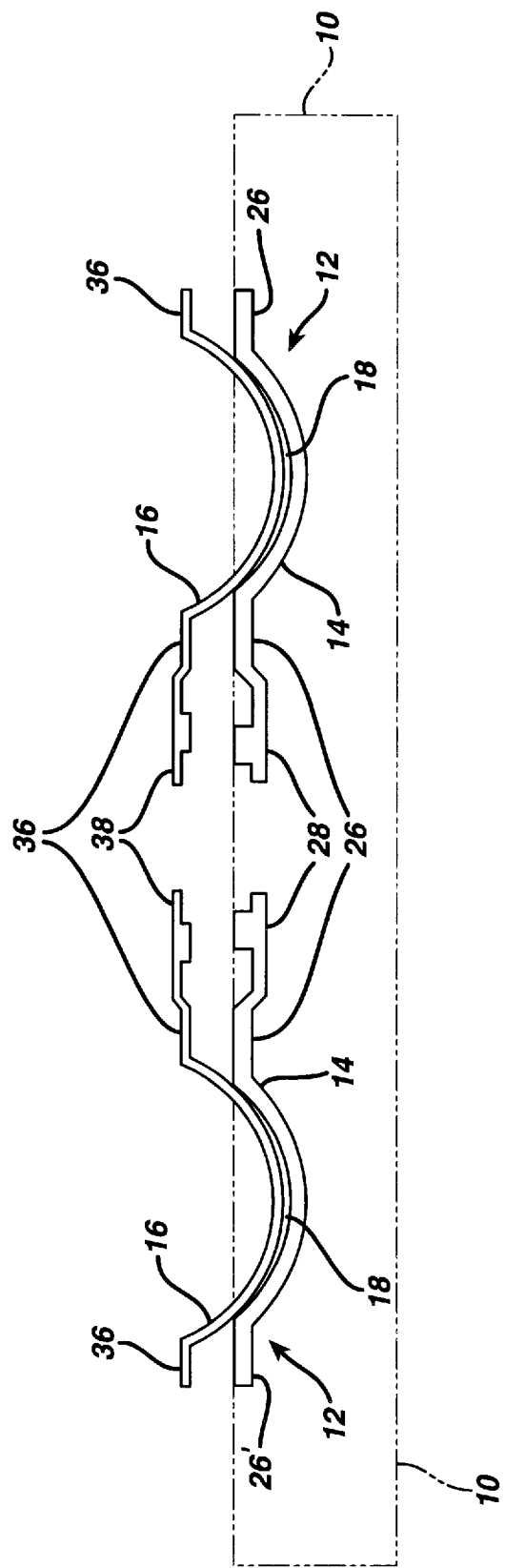
FIG. 1 is a front elevational view of a support pallet and an array of contact lens mold assemblies.
Figure 2:
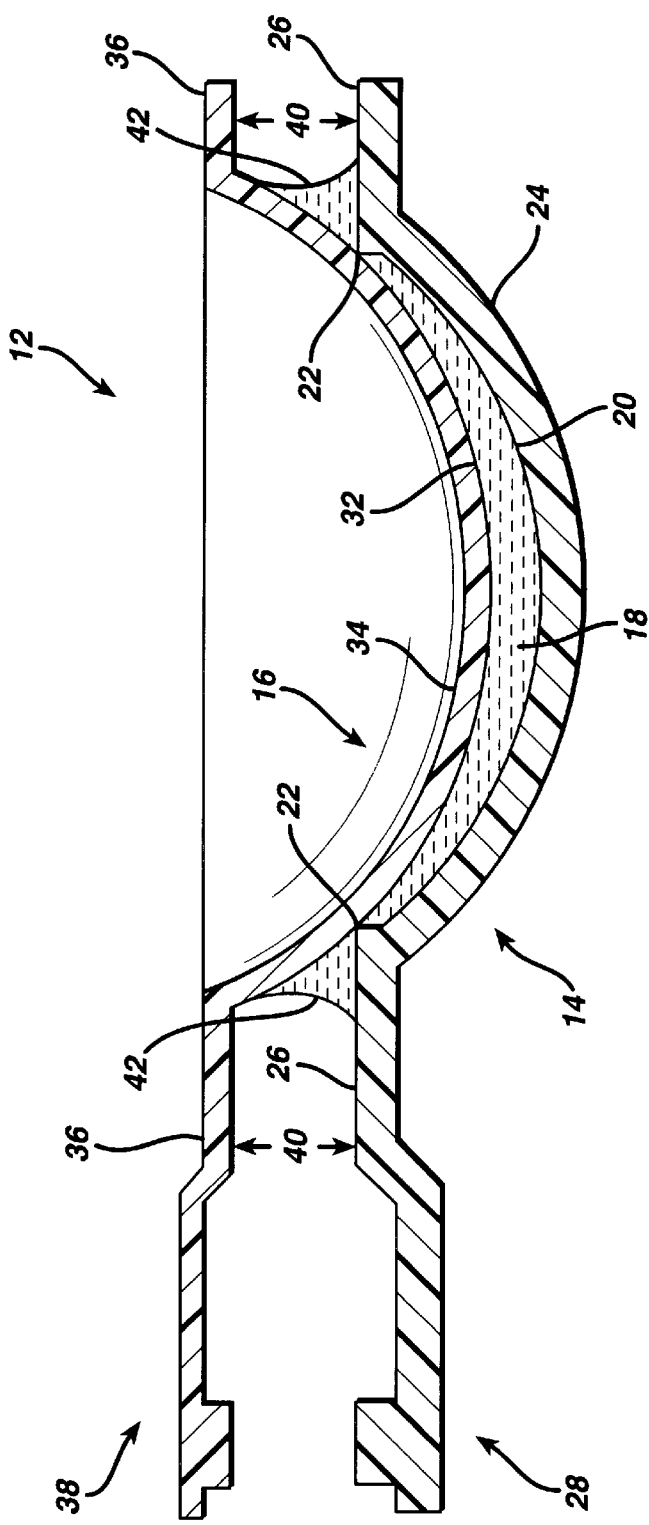
FIG. 2 is an enlarged side elevational and sectional view of a contact lens mold assembly.

Referring to the drawings in detail, and in particular initially to FIGS. 1 and 2, FIG. 1 illustrates a front elevational view of a support pallet 10 which supports thereon a row and column array, typically a two by four array, of contact lens mold assemblies 12, one of which is illustrated in further detail in FIG. 2.

FIG. 2 is an enlarged side elevational and sectional view of one contact lens mold assembly 12 which consists of a lower frontcurve mold 14 and an upper backcurve mold 16, which define therebetween a mold cavity for a contact lens 18.

The frontcurve and backcurve mold halves 14 and 16 are preferably formed of polystyrene but could be any suitable thermoplastic polymer which is sufficiently transparent to ultraviolet light to allow irradiation therethrough with light to promote the subsequent polymerization of a soft contact lens. A suitable thermoplastic such as polystyrene also has other desirable qualities such as being moldable to surfaces of optical quality at relatively low temperatures, having excellent flow characteristics and remaining amorphous during molding, not crystallizing, and have minimal shrinkage during cooling.

The frontcurve mold half 14 defines a central curved section with an optical quality concave surface 20, which has a circular circumferential knife edge 22 extending therearound. The knife edge 22 is desirable to form a sharp and uniform plastic radius parting line (edge) for the subsequently molded soft contact lens 18. A generally parallel convex surface 24 is spaced from the concave surface 20, and an annular essentially uniplanar flange 26 is formed extending radially outwardly from the surfaces 20 and 24. The concave surface 20 has the dimensions of the frontcurve (power curve) of a contact lens to be produced by the mold assembly, and is sufficiently smooth such that the surface of a contact lens formed by polymerization of a polymerizable composition in contact with the surface is of optically acceptable quality. The frontcurve mold half is designed with a thinness, typically 0.8 mm, and rigidity effective to transmit heat therethrough rapidly and to withstand prying forces applied to separate the mold half from the mold assembly during a demolding operation. The frontcurve mold half 14 further defines a generally triangular tab 28, integral with the flange 26 which projects from one side of the flange. Tab 28 is essentially uniplanar and extends to an injection hot tip which supplies molten thermoplastic to form the frontcurve mold half.

The backcurve mold half 16 defines a central curved section with an optical quality convex surface 32, a generally parallel concave surface 34 spaced from the convex surface 32, and an annular essentially uniplanar flange 36 formed extending radially outwardly from the surfaces 32 and 34. The convex surface 32 has the dimensions of the rear curve (which rests upon the cornea of the eye) of a contact lens to be produced by the backcurve mold half, and is sufficiently smooth such that the surface of a contact lens formed by polymerization of a polymerizable composition in contact with the surface is of optically acceptable quality. The backcurve mold half is designed with a thinness, typically 0.6 mm, and rigidity effective to transmit heat therethrough rapidly and to withstand prying forces applied to separate the mold half from the mold assembly during demolding. The backcurve mold half 16 also defines a generally triangular tab 38, similar to the triangular tab 28, integral with the flange which projects from one side of the flange. The tab 38 extends to an injection hot tip which supplies molten thermoplastic to form the backcurve mold half.

During the process of molding a contact lens, an excess amount of polymer or polymer mixture is initially deposited in a frontcurve mold, and then a backcurve mold is placed over the frontcurve mold and pressed thereagainst. This results in excessive polymer in the mold cavity being displaced and discharged therefrom and forming an excess polymer ring 42 outside of the knife edge 22.

The flanges 26 and 36 are designed to assist in demolding and part handling, and also protect the optical surfaces and the knife edge. The geometry of the triangular tabs 28 and 38 serves an additional function in straightening and orienting the assembled frontcurve/backcurve assembly 12 prior to demolding. When a frontcurve mold half or curve 14 is assembled with a backcurve mold half or curve 16, a gap 40 is formed between the two spaced flanges and projecting tabs which is important for demolding. The gap between the tabs is preferably in the range of 1.0 mm–3.0 mm, and is required to assist in the demolding operation, as explained in greater detail hereinbelow.

Referring to FIGS. 1 and 2, the contact lens mold assemblies 12 are supported in the pallet 10 with the annular flanges 26 and tabs 28 of the frontcurve mold 14 recessed slightly below the upper surface of the pallet 10. The annular flanges 36 and tabs 38 of the backcurve mold 16 are raised above the upper surface of the pallet, to allow a mechanical separating member to be inserted between the spaced flanges 26, 36 of the frontcurve and backcurve.

Figure 3:
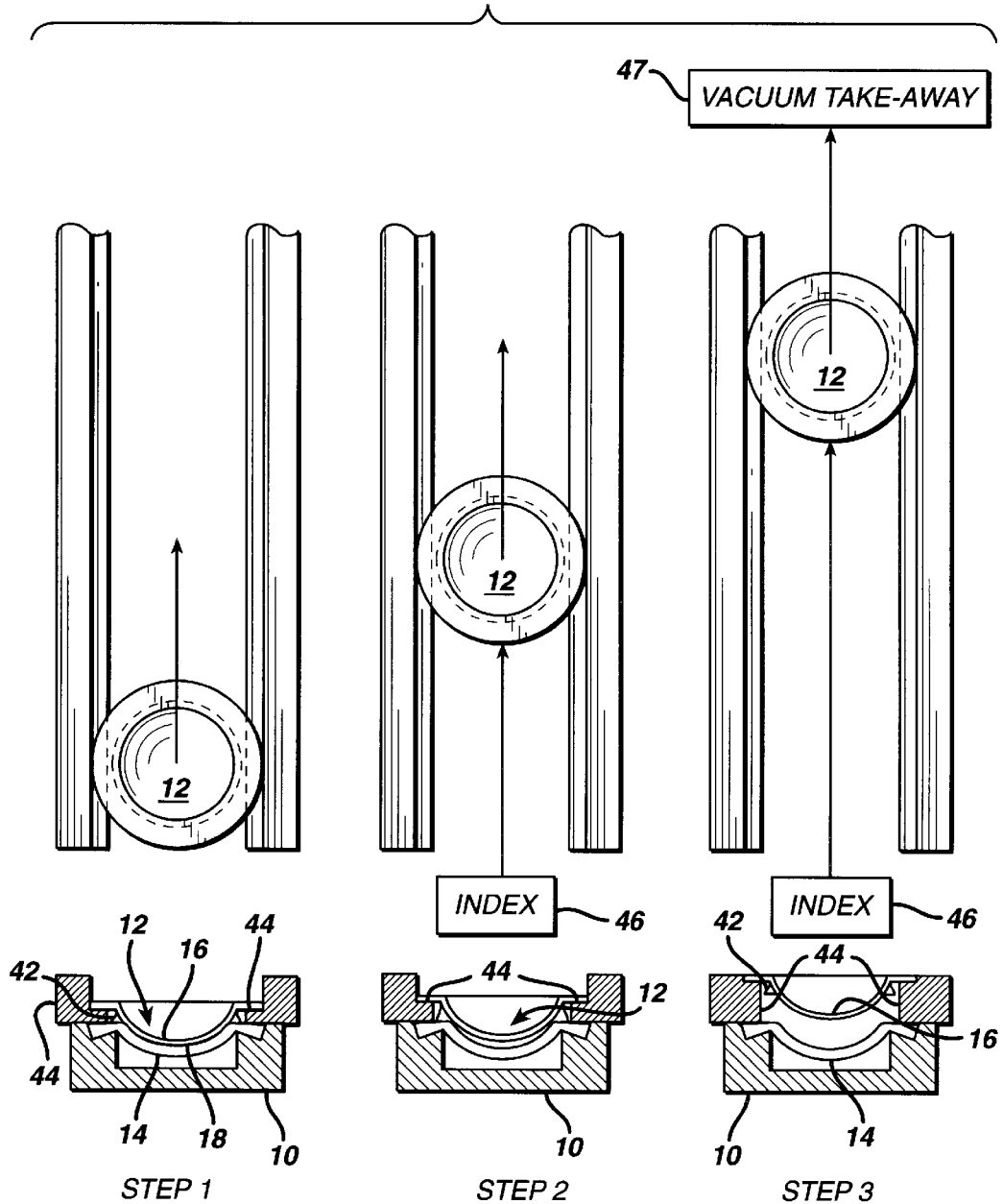
FIG. 3 is a diagrammatic representation of a wedge type demolding arrangement which utilizes a double-sided removal of a backcurve mold.

FIG. 3 is a diagrammatic representation of a wedge type demolding apparatus which utilizes a double-sided removal of the backcurve mold. The demolding apparatus illustrated in FIG. 3 includes a schematically illustrated mold pallet 10, a frontcurve mold 14, a backcurve mold 16, and a demolding cam wedge 44.

The demolding apparatus and process of FIG. 3 operates as follows.

STEP 1: The mold assembly 12, which includes the backcurve mold 16, the frontcurve mold 14, the lens 18 and the excess polymer ring 42, is heated (preferably from the top) at or immediately prior to step 1. The heating process can occur exclusively at step 1, or it may continue throughout the entire demolding operation. At the point illustrated in step 1, the wedge 44 does not stress the backcurve mold 16 and frontcurve mold 14, but is fully engaged in between the flanges 26 and 36 of the backcurve and frontcurve molds. Note that the wedge 44 does not interfere with the excess polymer ring 42 as such interference would cause a fouling condition which would render the process ineffective.

STEP 2: As shown in the top view, the pallet 10 and mold assembly 12 are moved by a product indexer or drive 46 to proceed along the wedges 44. The slope or cam angle of the wedge and/or the feed rate determine the rate of backcurve removal. A nonlinear wedge slope or cam angle and/or feed rate results in a nonlinear backcurve removal rate. The heating process also affects the acceptable removal rate. The amount of excess polymer 42 also influences the process conditions.

STEP 3: At this point, the mold assembly has been moved by the product indexer 46 to a point on the wedges 44 such that the backcurve mold 16 with the excess polymer ring 42 is completely separated from the frontcurve mold 14 and lens 18.

The required amount of separation or wedge height for effective demolding is dependent primarily upon the size of the excess polymer ring and the efficiency of the heating operation. A typical embodiment would allow for more wedge height than is theoretically necessary to ensure complete mold removal. At this point or directly thereafter, the now separated backcurve mold 16 and polymer ring 42 are removed by an overhead vacuum take-away system 47 which deposits the backcurves in a waste container for recycling.

Figure 4:
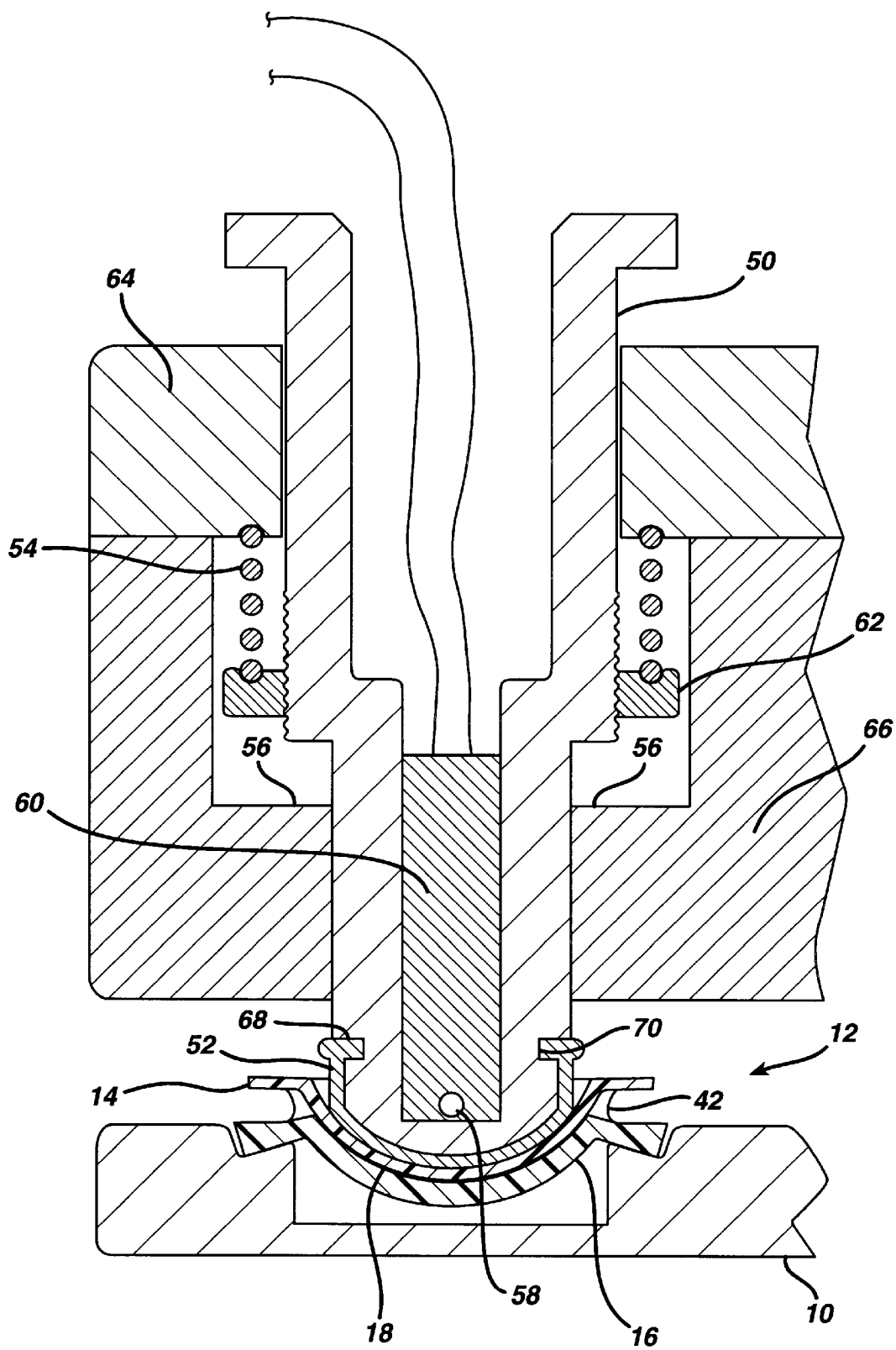
FIG. 4 illustrates a first embodiment of a conductive heat probe for conductive contact heating of the backcurve of a lens mold assembly during demolding.

FIG. 4 illustrates the basic components of a first embodiment of a conductive backcurve lens mold heater, and illustrates a contact lens mold assembly 12 seated in a typical support pallet 10. A spring loaded heat probe 50 with a compliant heat conductor 52 on the contoured end thereof contacts the mold assembly from above. FIG. 4 shows the assembly in the heating mode. However, it should be apparent that when the lens mold assembly 12 and pallet 10 are moved downwardly, the probe 50 will extend downwardly under the bias of spring 54 until it hits internal stops at 56.

FIG. 4 illustrates a cured contact lens 18 in a contact lens mold assembly 12 comprised of a frontcurve mold 14 and a backcurve mold 16, and an excess polymer ring 42. The heat probe 50 includes the compliant heat conductor 52, a thermocouple 58, and a cartridge heater 60. The assembly includes a spring pre-load adjustor 62 for spring 54, and is mounted in a top guide plate 64 and bottom guide fixture 66. The pre-load adjustor 62 is threadedly engaged to the probe 50 such that its position thereon, and the amount of pre-load supplied by the spring 54, is adjustable. The compliant heat conductor 52 includes a lower convex curved face having the same general shape as the internal concave surface forming the back of the backcurve mold 16. The compliant heat conductor includes an annular inwardly extending projection 68 which fits into a corresponding recessed annular groove 70 near the lower end of the probe 50 to lock those elements together. Alternative embodiments of the heat probe 50 can omit the compliant heat conductor 52, in which case of the relatively rigid end of the heat probe 50 would be shaped to the same general shape as the internal concave surface on the back of the backcurve mold 16.

Functional Steps

Step 1

The backcurve mold 14 and compliant conductor 52 begin the process not in contact. The cartridge heater 60 is heated by use of an appropriate electric control device and the thermocouple 58.

Step 2

As the lens mold assembly pallet 10 is raised, the compliant conductor 52 comes into contact with the backcurve mold 14.

Step 3

The lens mold assembly pallet 10 continues rising until the heat probe 50 has moved a sufficient distance such that spring 54 has supplied a desired contact force between the compliant conductor 52 and the backcurve mold 14.

Step 4

The assembly dwells in that position until such time as sufficient heat has conducted through the heat probe 50, the compliant conductor 52, and the backcurve mold 14 to raise the interface temperature between the backcurve mold and the cured contact lens to the desired level. The desired temperature is sufficiently high to allow easy release of the backcurve mold from the cured contact lens without causing the cured contact lens to release from the frontcurve mold.

Step 5

The lens mold pallet 10 is then lowered until contact between the compliant conductor 52 and the backcurve mold 14 is broken and there is sufficient clearance to translate the lens mold assembly pallet 10 with the mold assembly to a demold station. An optional function is to begin the demolding operation while the assembly is still in step 4 above.

Key process related features and options Heating

In the embodiment described above the source heat is an electric cartridge heater. In alternate embodiments, the heat source could be steam, hot water, RF, etc. Placement of the thermocouple may be different from that in the illustrated embodiment, and it does not have to be integral with the heater cartridge. The method of controlling the heating is important. It is believed that optimal demold conditions exist in fairly narrow time/temperature profiles. Therefore, for process consistency, a true proportional fractional wave control may be appropriate for the cartridge heater. For consistent heat flow, potting of the heater cartridge may also be appropriate. To minimize the temperature loss in the heat probe between cycles, the thermal mass ($C_p \times$Mass) of the heat probe should be maximized. Also, the heat probe material should have a moderate to high thermal conductivity.

A preferred embodiment of the compliant conductor 52 comprises a high temperature molded silicone piece with a contour on the external contacting surface which closely matches the contour of the noncritical core side of the backcurve mold. Other embodiments can include materials other than silicone. The criteria for this component is that it have a sufficiently high thermal conductivity and sufficiently high resistance to thermal degradation to transfer heat to the lens mold assembly effectively while maintaining compliance and dimensional stability. The degree to which the dimensional stability and compliance are required is dependent upon the amount of contact force used. The higher the contact force, the more important the contour of the machined surface on the heat probe 50 becomes and the less important the contour of the compliant conductor becomes. To this end, an alternate embodiment can utilize a rigid conductor in which the lower end of the heat probe 50 is machined to directly match the core side contour of the backcurve mold. If sufficient contact force is utilized, sufficient compliance exists in the backcurve mold itself to assure a low thermal resistance contact. Thus, a compliant conductor is not necessary in this embodiment.

The diameter of the contacting end of the heat probe 50, either compliant or rigid, is an important design variable in that the heat should ideally be directed to the lens 18 and not to the excess polymer ring 42. If the polymer ring receives too much heat it will tend to release from the backcurve mold during the demolding process which is undesirable. If the lens edge receives too much heat, it will tend to separate from the frontcurve during demolding and cause edge defects and/or missing lenses. Optimization of the diameter along with other process variables can maximize polymer ring removal rates while minimizing edge related defects in lenses and missing lenses.

Accordingly, the diameter of the contacting end of the heat probe 50 might be selected to be less than the diameter of a lens being demolded in some embodiments, and in other embodiments the diameter of the contacting end of the heat probe 50 might be greater than the diameter of a lens being demolded. Moreover, the geometry of the contacting end of the heat probe 50 might be selected to achieve particular heat transfer patterns. For instance, the end of the heat probe 50 might be annular shaped, such that heat is selectively transferred from the annular end to an annular area of the backcurve mold around the edge of the lens. Moreover, the heat probe might have a complex construction of several different materials, each having a selected thermal mass and thermal conductively, to achieve different heating patterns and profiles across the backcurve mold and lens. For instance, the heat probe might be constructed with concentric rings of different materials of different thermal masses and thermal conductivities to achieve a desired complex heating pattern of the backcurve mold and lens.

Figure 5:
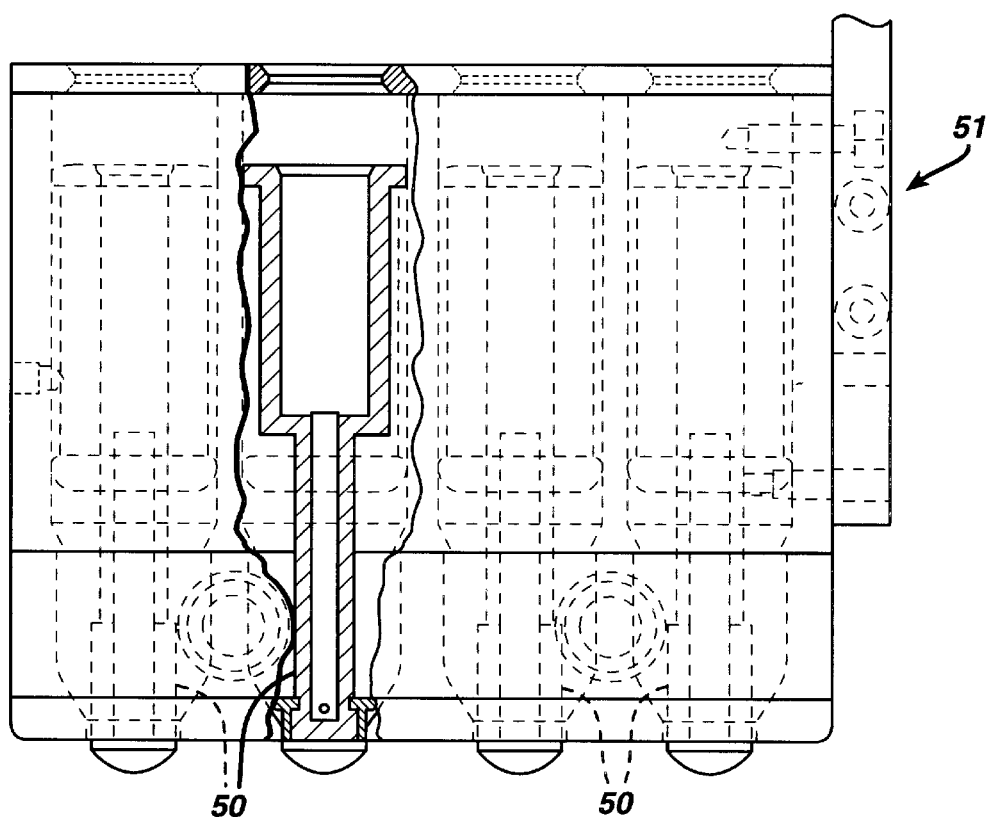
FIG. 5 illustrates an embodiment of a free-weighted conductive heat probe assembly pursuant to the teachings of the subject invention.

FIG. 5 illustrates an embodiment of a rigid conductor, free-weighted contact lens mold heater assembly 51 without springs 54. The heat probe 50 illustrated in FIG. 4 is normally mounted in an assembly which includes an array of such heat probes mounted and positioned to correspond to an array of contact lens mold assemblies positioned in a support pallet, with such a heat probe assembly being illustrated in alternative embodiments in FIGS. 5 and 6–8. In the embodiment of FIG. 5, the heat probes 50 are mounted free-weighted with a degree of lateral movement because the unit is designed to work with 8-cavity frame molds which preferably have large center-to-center tolerances.

Figure 6:
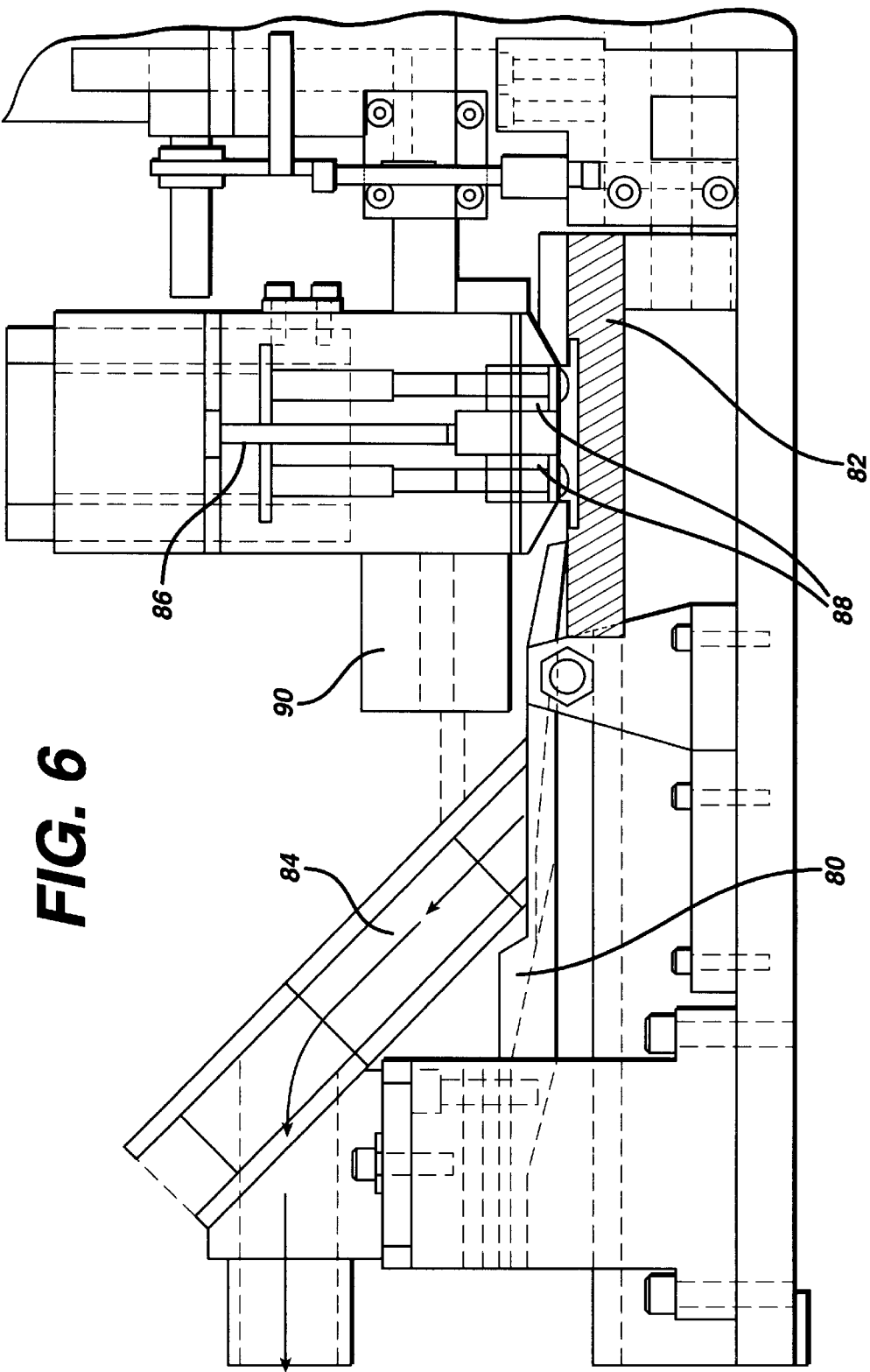
FIG. 6 illustrates a front elevational view of another embodiment of a conductively heated demolding apparatus.
Figure 7:
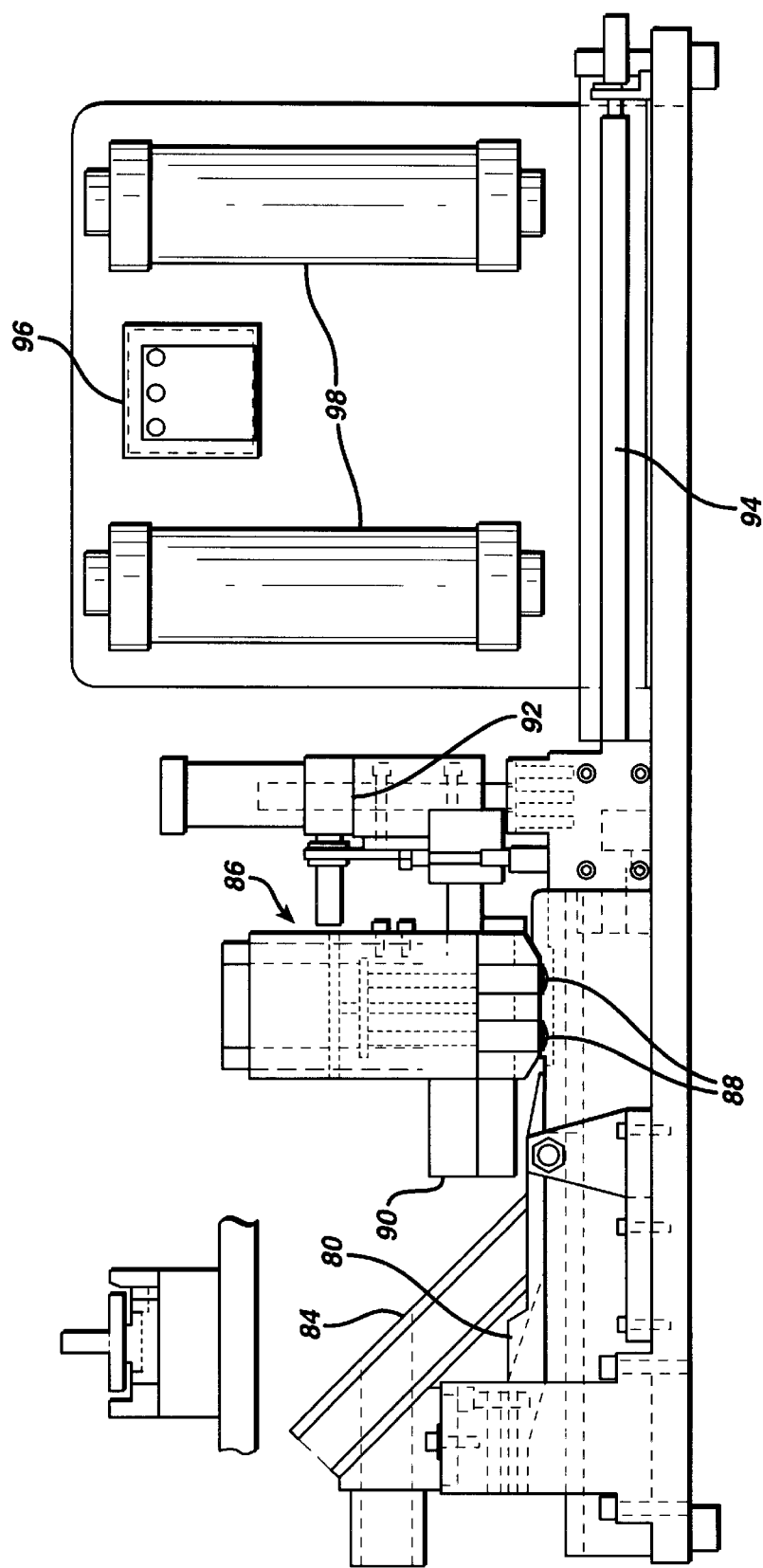
FIGS. 7 and 8 are respectively front elevational and top plan views of the same embodiment of FIG. 6 presented in an overall assembly view of the apparatus.
Figure 8:
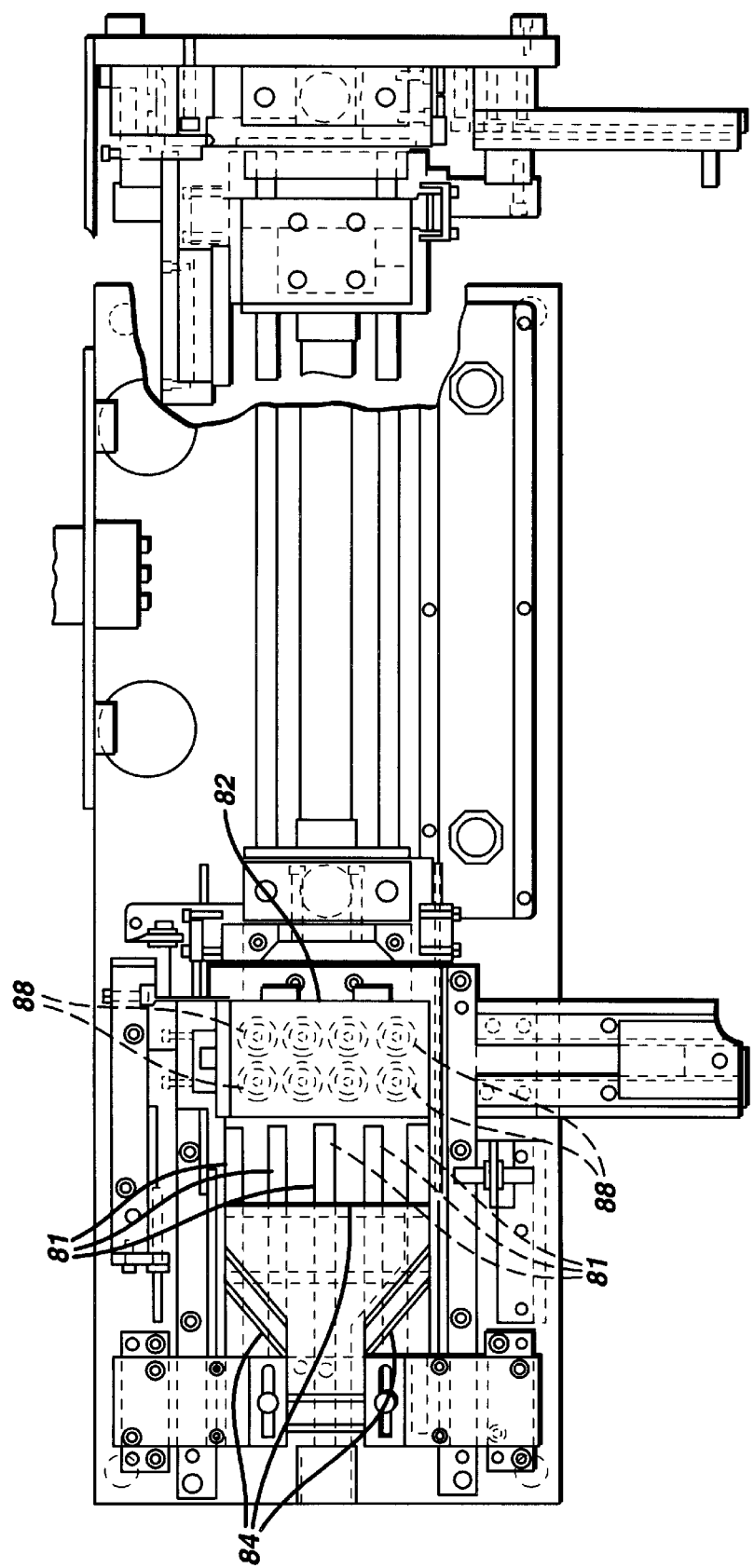

FIG. 6 illustrates a front elevational view of a conductively heated embodiment of a one sided wedge type demolding apparatus designed to utilize molds with reduced excess polymer rings 42. FIGS. 7 and 8 are respectively front elevational and top plan views of the same embodiment of FIG. 6 presented in an overall assembly view of the apparatus.

The demolding arrangement illustrated in FIGS. 6, 7 and 8 includes a wedge assembly or fixture 80, comprised of a plurality of separating wedges 81, a moving support pallet 82, a vacuum take-away hood 84, a heat conductive probe assembly 86 having a 2×4 array of heat conductive probes 88, a heat conductive probe lifting cam 90, a conductive probe assembly lift cylinder 92, a pallet drive hydraulic cylinder 94, a process controller/timer 96, and hydraulic fluid reservoirs 98.

In operation, the heat conductive probe assembly 86 is lifted vertically by the lift cylinder 92 via the lifting cam 90 such that a mold frame assembly 12 can be placed into the support pallet 82 without interfering with the conductive probes 88. The conductive probe assembly 86 is then lowered by the lift cylinder 92 via the lifting cam 90 so that the conductive probes 88 are resting under their own weight on the lens portions of the noncritical side of the backcurve molds 16.

At this point, heat is conducted through the conductive probes 88 into the lens mold assemblies. In operation, the conductive probes 88 have cartridge heaters which are maintained at a specific temperature. After a period of time programmed into the process controller/timer 96 has elapsed, the pallet 82 is moved in a right to left direction by the hydraulic cylinder 94 which is fed from the reservoirs 98. The conductive probe assembly 86 is moved simultaneously with the pallet 82 such that the weight of the conductive probe assembly 86 remains fully on the backcurve molds 16. After a given travel distance, the backcurve mold excess polymer rings begin separating by the cam or wedge profiling associated with the wedge assembly 80. At a point before full backcurve mold separation, the cam profile on the conducting probe assembly lifting cam 90 lifts the conductive probe assembly 86 and conductive probes 88 clear of the mold assemblies. As the pallet 82 continues leftward, the backcurves 16 separate completely from the frontcurve frame 14 and are vacuumed away by the vacuum take-away hood 84. The pallet 82 then reaches its leftmost point and the frontcurve mold frame 14 with lenses 18 is removed. The unit is then reset and is ready for the next cycle of operation.

One purpose of maintaining the conductive probes 88 in contact with the backcurve molds 16 while the molds 16 are engaging the wedge assembly 80 is to provide and maintain a normal force on each backcurve mold 16 to counteract a shear force generated by the profiling angle on the wedge and acting on the partially released lens. The hydraulic drive cylinder 94 functions and is used to maintain a constant maximum force on the pallet in the direction of travel thereof. This constant maximum force allows the pallet 82 to slow down or speed up depending upon how much resistance is encountered during the separation of the backcurve. This feature helps to compensate for process variations due to temperature variations, excess polymer ring sizes, etc.

While several embodiments and variations of the present invention for conductive probes for heating contact lens mold assemblies during demolding are described in detail herein, it should be apparent that the disclosure and teachings of the present invention will suggest many alternative designs to those skilled in the art.

What is claimed is:

1. Apparatus for demolding a lens mold assembly, comprising a frontcurve mold which has a central lens mold section with a surrounding flange, and a corresponding backcurve mold which has a central lens mold section with a surrounding flange and a concave surface, and a molded ophthalmic lens which is formed between the frontcurve and backcurve molds, and wherein the flanges of the frontcurve and backcurve molds are spaced apart relative to each other, comprising a conductive heating probe, the conductive heating probe including a convex heating surface which is the same general shape as the concave surface on the backcurve mold, the conductive heating probe further including a compliant heat conductor to conform to the concave surface on the backcurve mold, and means for contacting said conductive heating probe with the backcurve mold of the lens mold assembly to conductively heat the backcurve mold, in which heat is conducted by the backcurve mold to cause a temperature gradient between the backcurve mold and the lens being demolded, with the temperature gradient causing a differential expansion and shifting of a surface of the backcurve mold relative to a surface of the lens to lessen the adhesion therebetween to assist in separation of the molds, while leaving the lens in the frontcurve mold.

2. Apparatus for demolding a mold assembly as claimed in claim 1, wherein the compliant conductor comprises a thin element positioned on an end of the conductive heating probe.

3. Apparatus for demolding a mold assembly as claimed in claim 1, wherein the conductive heating probe is spring mounted in a support plate to spring bias the conductive heating probe against the backcurve mold.

4. Apparatus for demolding a mold assembly as claimed in claim 3, including a spring preload adjustor for adjusting the preload bias on the spring of the conductive heating probe.

5. Apparatus for demolding a mold assembly as claimed in claim 1, wherein the conductive heating probe includes a cartridge electrical heating element.

6. Apparatus for demolding a mold assembly as claimed in claim 1, wherein the conductive heating probe includes a thermocouple for detecting and controlling the temperature of the conductive heating probe.

7. Apparatus for demolding a mold assembly as claimed in claim 1, including a support pallet for supporting the mold assembly and a separating fixture to be positioned between the spaced flanges of the frontcurve and backcurve molds of the mold assembly for separating the molds.

8. Apparatus for demolding a mold assembly as claimed in claim 7, wherein the support pallet is formed to support a plurality of mold assemblies.

9. Apparatus for demolding a mold assembly as claimed in claim 8, wherein the support pallet is formed to support a row and column array of mold assemblies.

10. Apparatus for demolding a mold assembly as claimed in claim 9, including a conductive heating probe assembly, having a row and column array of conductive heating probes therein, and means for contacting said array of conductive probes with each backcurve mold of the array of mold assemblies, for conductively heating the array of mold assemblies.

11. Apparatus for demolding a lens mold assembly, comprising a frontcurve mold which has a central lens mold section with a surrounding flange, and a corresponding backcurve mold which has a central lens mold section with a surrounding flange, and a molded ophthalmic lens which is formed between the frontcurve and backcurve molds, and wherein the flanges of the frontcurve and backcurve molds are spaced apart relative to each other, comprising a conductive heating probe and means for contacting said conductive heating probe with the backcurve mold of the lens mold assembly to conductively heat the backcurve mold, in which heat is conducted by the backcurve mold to cause a temperature gradient between the backcurve mold and the lens being demolded, with the temperature gradient causing a differential expansion and shifting of a surface of the backcurve mold relative to a surface of the lens to lessen the adhesion therebetween to assist in separation of the molds, while leaving the lens in the frontcurve mold, said apparatus further including a support pallet for supporting the mold assembly and a separating fixture to be positioned between the spaced flanges of the frontcurve and backcurve molds of the mold assembly for separating the molds, wherein the support pallet is formed to support a row and column array of mold assemblies, and said apparatus further including a conductive heating probe assembly having a row and column array of conductive heating probes therein, and means for contacting said array of conductive probes with each backcurve mold of the array of mold assemblies for conductively heating the array of mold assemblies, and further including a lift cylinder for raising and lowering the conductive heating probe assembly relative to the support pallet, and means for maintaining the weights of the individual conductive heating probes on the array of mold assemblies during demolding to maintain the array of mold assemblies properly positioned in the support pallet during demolding.

12. Apparatus for demolding a mold assembly as claimed in claim 11, including an indexing means for conveying the pallet and a conductive probe assembly lifting cam which lifts the conductive probe assembly from the pallet after demolding as said indexing means conveys the pallet past the conductive probe assembly lifting cam.

13. Apparatus for demolding a lens mold assembly, comprising a frontcurve mold which has a central lens mold section with a surrounding flange, and a corresponding backcurve mold which has a central lens mold section with a surrounding flange, and a molded ophthalmic lens which is formed between the frontcurve and backcurve molds, and wherein the flanges of the frontcurve and backcurve molds are spaced apart relative to each other, comprising a conductive heating probe and means for contacting said conductive heating probe with the backcurve mold of the lens mold assembly to conductively heat the backcurve mold, in which heat is conducted by the backcurve mold to cause a temperature gradient between the backcurve mold and the lens being demolded, with the temperature gradient causing a differential expansion and shifting of a surface of the backcurve mold relative to a surface of the lens to lessen the adhesion therebetween to assist in separation of the molds, while leaving the lens in the frontcurve mold, wherein the conductive heating probe is spring mounted in a support plate to spring bias the conductive heating probe against the backcurve mold.

14. Apparatus for demolding a mold assembly as claimed in claim 13, including a spring preload adjustor for adjusting the preload bias on the spring of the conductive heating probe.

15. Apparatus for demolding a mold assembly as claimed in claim 13, wherein the conductive heating probe includes a cartridge electrical heating element.

16. Apparatus for demolding a mold assembly as claimed in claim 13, wherein the conductive heating probe includes a thermocouple for detecting and controlling the temperature of the conductive heating probe.

17. Apparatus for demolding a mold assembly as claimed in claim 13, including a support pallet for supporting the mold assembly and a separating fixture to be positioned between the spaced flanges of the front curve and backcurve molds of the mold assembly for separating the molds.

18. Apparatus for demolding a mold assembly as claimed in claim 17, wherein the support pallet is formed to support a plurality of mold assemblies.

19. Apparatus for demolding a mold assembly as claimed in claim 18, wherein the support pallet is formed to support a row and column array of mold assemblies.

20. Apparatus for demolding a mold assembly as claimed in claim 13, including a conductive heating probe assembly having a row and column array of conductive heating probes therein, and means for contacting said array of conductive probes with each backcurve mold of the array of mold assemblies for conductively heating the array of mold assemblies.

21. Apparatus for demolding a mold assembly as claimed in claim 20, including a lift cylinder for raising and lowering the conductive heating probe assembly relative to the support pallet, and means for maintaining the weights of the individual conductive heating probes on the array of mold assemblies during demolding to maintain the array of mold assemblies properly positioned in the support pallet during demolding.

22. Apparatus for demolding a mold assembly as claimed in claim 21, including an indexing means for conveying the pallet and a conductive probe assembly lifting cam which lifts the conductive probe assembly from the pallet after demolding as said indexing means conveys the pallet past the conductive probe assembly lifting cam.

* * * * *